United States Patent
Scheuring et al.

(10) Patent No.: US 6,419,864 B1
(45) Date of Patent: Jul. 16, 2002

(54) METHOD OF PREPARING FILLED, MODIFIED AND FIBER REINFORCED THERMOPLASTICS AND TWIN SCREW EXTRUDER FOR PUTTING THE METHOD INTO PRACTICE

(75) Inventors: Bernhard Scheuring, Affalterbach; Erwin Häring, Stuttgart; Daniel Schwendemann, Gerlingen, all of (DE)

(73) Assignee: Krupp Werner & Pfleiderer GmbH, Stuttgart (DE)

(*) Notice: Subject to any disclaimer, the term of this patent is extended or adjusted under 35 U.S.C. 154(b) by 0 days.

(21) Appl. No.: 09/416,680

(22) Filed: Oct. 12, 1999

(30) Foreign Application Priority Data

Oct. 19, 1998 (DE) .......................................... 198 48 124

(51) Int. Cl.⁷ .............................. B29B 7/48; B29B 9/06; B29C 47/60; B29C 47/76
(52) U.S. Cl. ..................... 264/102; 264/136; 264/143; 264/211.23; 264/349
(58) Field of Search ................................ 264/102, 136, 264/143, 211.23, 349

(56) References Cited

U.S. PATENT DOCUMENTS

| | | | |
|---|---|---|---|
| 3,304,282 A | * | 2/1967 | Cadus et al. ............ 264/349 X |
| 4,824,256 A | | 4/1989 | Haring et al. |
| 5,110,275 A | | 5/1992 | Scheuring |
| 5,318,358 A | | 6/1994 | Wobbe et al. |
| 5,593,227 A | | 1/1997 | Scheuring et al. |
| 5,879,602 A | | 3/1999 | Scheuring |

FOREIGN PATENT DOCUMENTS

| | | |
|---|---|---|
| EP | 0 056 703 B2 | 3/1987 |
| FR | 1425099 A | 12/1965 |
| FR | 2025464 A | 9/1970 |

* cited by examiner

*Primary Examiner*—Leo B. Tentoni
(74) *Attorney, Agent, or Firm*—Robert FI Conte; Lee, Mann, SMith, McWilliams, Sweeney & Ohlson

(57) ABSTRACT

A method of preparing filled, modified and fiber reinforced thermoplastics is distinguished by the fact that polymer as matrix material together with blend polymer is fed to a twin screw extruder in a single manufacturing process, filler being supplied through a feeder device after the melting. Then fiber rovings are fed in and cut into long fiber sections in a fiber incorporation zone.

3 Claims, 2 Drawing Sheets

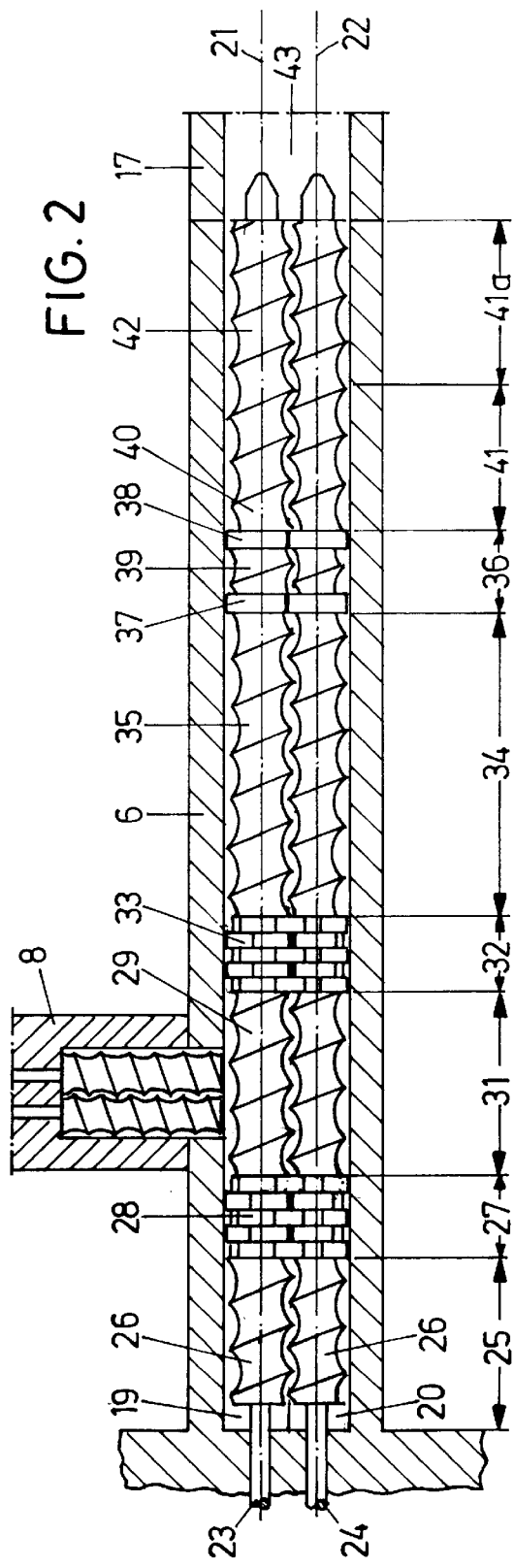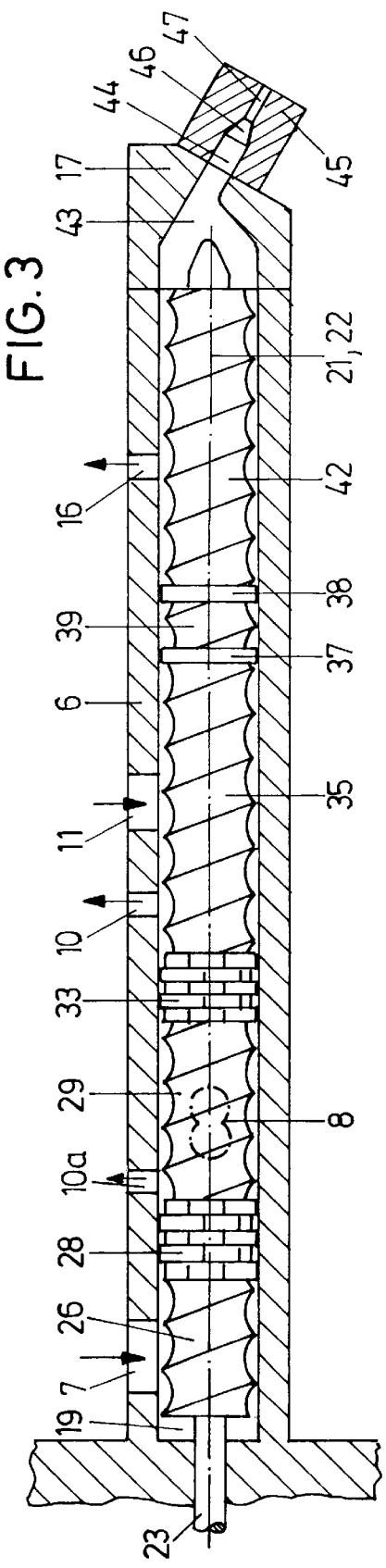

METHOD OF PREPARING FILLED, MODIFIED AND FIBER REINFORCED THERMOPLASTICS AND TWIN SCREW EXTRUDER FOR PUTTING THE METHOD INTO PRACTICE

BACKGROUND OF THE INVENTION

1. Field of the Invention

The invention relates to a method of preparing filled, modified and fiber reinforced thermoplastics by mixing polymers, blend polymers, possibly additives, fillers and fibers, and to a twin screw extruder for putting the method into practice.

2. Background Art

A method of the generic type is known, in which cut glass fibers of an average length of 3 to 6 mm are fed to an extruder by means of so-called lateral feed. These fibers are cut to an average length of 0.3 to 0.6 mm when mixed in. Fundamentally, the advantage of the mixed in fillers resides in that the finished product will be less expensive; as a rule, fillers also result in an increase of the elastic modulus of the thermoplastic and in the improvement of the dimensioned accuracy of components made from the thermoplastic by injection molding. As a rule, blending is employed to improve the free flowing properties of the thermoplastics and to make them more resistant to temperature and chemicals as well as to improve the mechanical properties such as impact strength.

It is further known to add fibers in the form of fiber sections of an average fiber length of more than 1.5 mm to thermoplastics. However, thermoplastics of this type are not sufficiently true to size for some fields of application, moreover, the impact strength leaves much to be desired. Additionally, temperature- and shear-sensitive polymers decompose during repeated melting and working processes, for instance during the subsequent incorporation of fillers.

U.S. Pat. No. 5,110,275 teaches an extruder to which glass fibers are added in the form of a fiber strand, a so-called fiber roving, in such a way that sufficient wetting with molten plastics takes place in the extruder.

U.S. Pat. No. 5,879,602 teaches an impregnating device in which the fiber rovings to be added to the extruder are impregnated with plastics.

The known extruders have in common that the fibers are broken into so-called short fibers, i.e. to very short pieces of 0.2 to 0.7 mm of length.

A so-called pulltrusion method is known from EP 0 056 703 B2, in which continuous fiber strands are pulled through a melt of plastics for a composite material to be formed. In this case, the fibers are maintained over their full length; but this method can only be used in the case of very low-viscous plastic melts and can therefore be applied only to a limited extent.

SUMMARY OF THE INVENTION

It is an object of the invention to embody a method of the generic type such that the thermoplastics produced possess high mechanical strength and high impact strength as well as splinterproofness upon rupture and high dimensioned accuracy during injection molding and to provide a twin screw extruder for putting the method into practice.

According to the invention, this object is attained by the following steps: a twin screw extruder is provided, having shafts that are drivable to rotate in the same direction, a conveying direction, a feed zone, a melting zone, a fiber feed zone, a fiber incorporation zone, a vent zone and a discharge zone; polymer and blend polymer are metered and fed to the feed zone; polymer and blend polymer are melted and mixed in the melting zone; filler is fed into the filler feed zone; polymer, blend polymer and filler are mixed and kneaded in the filler incorporation zone; fiber rovings are fed into the fiber feed zone; the fibers are cut to long fiber sections of at least 1.0 mm of average length and incorporated in the fiber incorporation zone; degassing by vacuum takes place in the vent zone; and the filled, modified and long-fiber reinforced thermoplastic is discharged in the discharge zone. The combination of the phases of the method specified therein helps produce thermoplastics which, upon injection molding, will give a product of special dimensioned accuracy, high mechanical strength and high impact strength as well as splinterproofness upon rupture. This is effected in particular by the long fiber sections. So far, it has not been possible to produce this thermoplastic in a single-step process. The single-step process according to the invention also ensures the use of polymers of special temperature and shear sensitivity such as polyester. Bumpers for vehicles can for example be made from thermoplastics of this type.

The extruder employed for putting the method into practice is distinguished in particular by a casing; shafts which are drivable to rotate in the same direction and which are parallel to each other in the casing and which define a conveying direction; screw elements and kneading disks which are mounted on the shafts; a feeder port for polymer and blend polymer; a melting zone provided downstream of the feeder port seen in the conveying direction; a filler incorporation zone provided downstream of the filler feed device seen in the conveying direction; at least one inlet port for fiber rovings which is provided downstream of the filler incorporation zone and opens into a fiber feed zone; a fiber incorporation zone which is formed downstream of the fiber feed zone and in which a pair of mixing elements and conveying screw elements are mounted alternately on the shafts; a vacuum vent zone which is provided downstream of the fiber incorporation zone; and a discharge head which is disposed downstream in the conveying direction. In this case, extremely gentle treatment of the plastic and the fibers takes place in the fiber incorporation zone so that the fibers are broken only to some minor extent, i.e. they are maintained in a randomly averaged range of length of 1.5 to 4 mm. It is of advantage if only a single mixing element is available on each shaft, i.e. a pair of mixing elements on both shafts, and subsequently a conveying screw element before the next pair of mixing elements.

The development according to which the discharge head comprises at least one die channel having a channel section which tapers continuously in the conveying direction and to the aperture angle a of which a $\leq 30°$ applies, and according to which the tapering channel section is followed by a cylindrical channel section of a length l and a diameter d, the ratio l/d being great, and according to which $l/d \geq 5$ applies to the ratio l/d, ensures that the glass fibers are enclosed in the plastic material and do not project there-from, which might give rise to considerable trouble during the subsequent treatment on injection molding machines. The preceding impregnation of the fiber rovings ensures a good and sufficient incorporation of the fiber sections into the thermoplastic, there being no need of a process of intimate kneading during which the fiber sections would be reduced to too small pieces.

Further features, advantages and details of the invention will become apparent from the ensuing description of an exemplary embodiment, taken in conjunction with the drawing.

BRIEF DESCRIPTION OF THE DRAWING

FIG. 2 is a horizontal section through the extruder seen in FIG. 1;

FIG. 3 is a vertical section through the extruder seen in FIG. 1; and

DESCRIPTION OF THE PREFERRED EMBODIMENT

Figure 1:
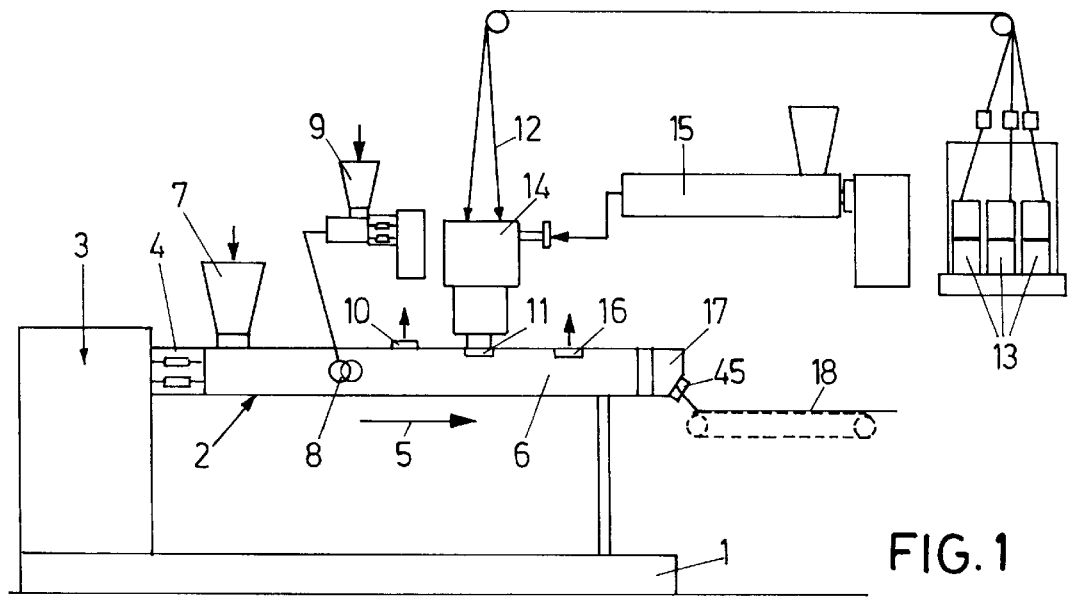
FIG. 1 is a diagrammatic lateral view of an installation for the compounding of plastics with fillers, fibers and blend.
Figure 4:
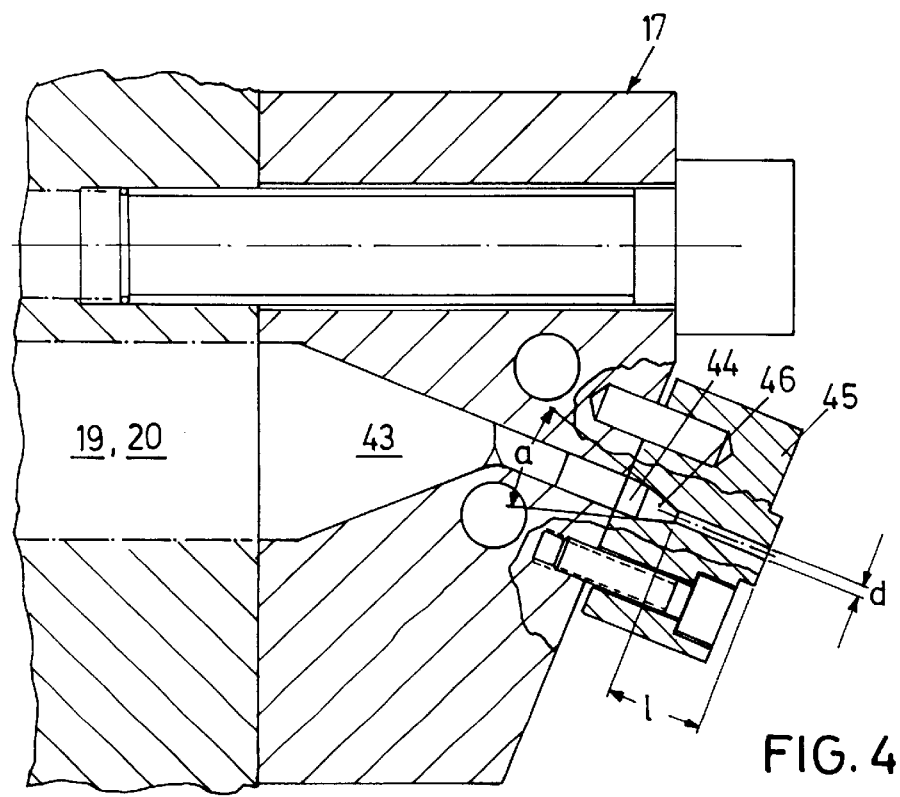
FIG. 4 is a vertical section through the discharge head roughly outlined in FIG. 1.

The installation seen in FIG. 1 for compounding filled, modified and long-fiber reinforced plastics comprises an extruder 2, which supports itself on a base frame 1 and which is preceded by a drive unit 3 via a coupling 4. A number of devices which will be specified below discharge into the casing 6 of the extruder 2 in the conveying direction 5 thereof. In vicinity to the coupling 4, i.e. at the upstream end seen in the conveying direction 5, a feed hopper 7 opens into the casing 6, through which polymer which is to be prepared, for instance polyester as matrix material and blend, are metered into the extruder 2. Downstream of the feed hopper 7 seen in the conveying direction 5, a twin screw conveyor 8 opens into the casing 6, by means of which filler is added. The filler is metered in a metering device 9 disposed upstream of the conveyor 8. Downstream of where the conveyor 8 discharges—seen in the conveying direction 5—a vent 10 is provided, through which degassing and venting takes place towards atmosphere, i.e. not by vacuum. In the casing 6, this vent 10 is followed by an inlet port 11 for fiber rovings 12, in particular glass fiber rovings. Provision may also be made for several inlet ports 11. The rovings are unwound as strands from corresponding coils 13, possibly guided through an impregnating device 14 and then led through the inlet port 11 into the casing 6. Disposed upstream of the impregnating device 14 is a feed extruder 15 for the metered addition of the impregnant which is matrix material. An impregnating device 14 of this type is known from U.S. Pat. No. 5,879,602, to which reference is made explicitly for details. A vacuum vent 16 is provided in the casing 16 further downstream in the conveying direction 5. A discharge head 17 is provided at the downstream end of the casing 6. The discharge head 17 is followed by a driven conveyor belt 18.

The internal structure of the extruder 2 will become apparent from FIGS. 2 and 3. The casing 6 conventionally comprises two intersecting casing bores 19, 20, i.e. it has an approximately figure-8-type interior cross-section. Disposed in these casing bores 19, 20 are two shafts 23, 24, which are concentric of the central longitudinal axes 21, 22 of the casing bores 19, 20 and which are driven to rotate in the same direction by the drive unit 3 via the coupling 4. In the vicinity of the feed hopper 7, i.e. in the vicinity of a feed zone 25, intermeshing screw elements 26 are mounted on the shafts 23, 24, these screw elements 26 being followed by kneading disks 28 which are mounted on the shafts 23, 24 in a melting zone 27. Kneading disks 28 of this type, which are arranged in a so-called kneading block, are known for instance from U.S. Pat. No. 4,824,256, to which reference is made. The plastic material supplied by the screw elements 26 from the feed hopper 7 is melted in a process of intimate kneading and shearing by means of these kneading disks 28, the additives, which may have been added already in the feed hopper 7, and the blend polymer being melted and incorporated.

The kneading disks 28 in the form of kneading blocks are followed by screw elements 29 which are similar to the screw elements 26 and serve to convey. They extend over a filler feed zone 31 in which the screw conveyor 8 discharges into the casing 6 and through which reverse venting towards atmosphere takes place counter to the conveying direction 5. Between the kneading disks 28 and the port of the screw conveyor 8, a vent 10a discharges from the casing 6, reverse venting towards atmosphere and counter to the conveying direction 5 taking place therethrough. The fillers are incorporated into the plastic material in a filler incorporation zone 32 where kneading disks 33 are mounted on the shafts 23, 24, which are fundamentally similar to the kneading disks 28 and which also have the form of so-called kneading blocks. The vent 10 is provided between the kneading disks 33 and the inlet port 11 for fiber rovings 12. The filler incorporation zone 32 is followed by a fiber feed zone 34, in which screw elements 35 are mounted on the shafts 23, 24, which are fundamentally similar to the screw elements 26 and 29. The inlet port 11 for fiber rovings 12 opens into this fiber incorporation zone 24. This portion may basically be designed as illustrated and described in U.S. Pat. No. 5,110,275, to which reference is made explicitly.

This fiber feed zone 34 is followed by a fiber incorporation zone 36, where the glass fibers are incorporated gently, i.e. without substantial destruction, as so-called long fibers into the matrix material which is formed by polymer and filled with fillers and additionally provided with blend polymer. For this gentle mixing to take place, mixing elements 37, 38 are provided at an axial distance from each other on the shafts 23, 24, a pair of mixing elements 37 and 38 being followed by screw elements 39, 40 that serve to convey. These mixing elements 37 and 38 may be mixing teeth as disclosed in U.S. Pat. No. 5,318,358 or they may be mixing elements as known from U.S. Pat. No. 5,593,227, to each of which reference is made. In the manufacture of fiber reinforced strands for the production of pellets, the fibers of the fiber rovings 12 are cut into fiber sections of more than 1.0 mm on an average and in particular of 1.5 to 4.0 mm. In the manufacture of fiber reinforced strips and sections, the length of the fiber sections may amount to 10 to 50 mm on an average. The fiber sections become the shorter, the more mixing elements 37 and 38 are provided and the more specific energy is introduced via the shafts 23, 24.

The fiber incorporation zone 36 is followed by a vent zone 41 which is allocated to the vacuum vent 16 and which is in turn followed by a pressure build-up zone 41a. The described screw elements 42 are also provided in these zones 41, 41a.

As usual, the discharge head comprises a tapering outlet channel 43 which discharges into several die channels 44 formed in a so-called apertured strip 45 which is screwed frontally on the discharge head 17. Each die channel has a tapered channel section 46, a <30° applying to the aperture angle thereof. The taper of this channel section 46 or its reduced cross-section in the conveying direction 5 takes place over a long distance so that the acceleration of the material discharged through the die channel 44 takes place slowly and continuously. The subsequent cylindrical channel section 47 has a diameter d and a length l, which is comparatively long as compared with the diameter. $l/d \geq 5$ applies, this ratio being the greater, the smaller the diameter d. This optimized design of the die channels 44 in the apertured strip 45 helps attain that the long fibers contained in the plastics are not peeled off, but are enclosed and stay enclosed in the extruded plastic strand. The plastic strands extruded side by side on the conveyor belt 18 are fed to a pelletizing die (not shown), where they are comminuted into pellets. The fact that the long fibers do not project from the individual plastic strands ensures that the individual pellets have a smooth surface and are free flowing, which is important for gravity feed to an injection molding machine or the like. If strips or sections are extruded instead of pellets, then known conventional dies may be used.

Recipe ranges are 30 to 70% by weight polymer up to 50% by weight filler, usually talcum, chalk, etc.

up to 50% by weight blend polymer 5 to 50% by weight fiber, usually glass, carbon fiber up to 20% by weight additives.

An example of a recipe is

49% by weight polypropylene (PP) as matrix material

25% by weight talcum as a filler

10% by weight ethylene-propylene-diene rubber (EPDM) as blend polymer

15% by weight glass fibers

1% by weight additives.

The weight percentages (% by weight) refer to the total weight of the finished thermoplastic.

What is claimed is:

1. A method of preparing filled, modified and fiber reinforced thermoplastics by mixing polymers, blend polymers, fillers and fibers, comprising the following steps:

providing a twin screw extruder (2) having shafts (23, 24) that are drivable to rotate in the same direction, a conveying direction (5), a feed zone (25), a melting zone (27), a filler feed zone (31), a filler incorporation zone, a fiber feed zone (34), a fiber incorporation zone (36), a vent zone, and a discharge zone;

feeding metered polymer and blend polymer to said feed zone (25);

melting and mixing said polymer and blend polymer in said melting zone (27);

feeding filler into a filler feed zone (31);

mixing and kneading in said filler incorporation zone;

providing at least one of providing reverse atmospheric venting from the feeding of the fillers counter to the conveying direction (5) and performing atmospheric venting and degassing between the incorporation of the filler and the feeding of the fiber rovings (12);

feeding fiber rovings (12) into said fiber feed zone (34);

cutting said fibers to long fiber sections of an average length of 1.5 to 4.0 mm and incorporating said long fiber sections in said fiber incorporation zone (36) into said mixed and kneaded polymer, blend polymer and filler;

degassing by vacuum in said vent zone; and discharging filled, modified and longfiber reinforced thermoplastic in said discharge zone.

2. A method according to claim 1, wherein for the production of one of strips and sections from said filled, modified and long fiber reinforced thermoplastic, the fibers are cut into fiber sections of an average length of 10 to 50 mm.

3. A method according to claim 1, wherein the fiber rovings (12) are impregnated with part of said polymer before being fed into said fiber feed zone (34).

* * * * *